United States Patent [19]
Reines et al.

[11] 3,962,552
[45] June 8, 1976

[54] SWITCHING NETWORK AND PERIPHERAL CIRCUITS FOR TELECOMMUNICATIONS SYSTEM

[75] Inventors: Jose Reines, Glen Ellyn; Eric G. Platt, Darien; Stanley Earl White, Hoffman Estates; Marion Casimir Byckowski, Prospect Heights, all of Ill.

[73] Assignee: International Telephone and Telegraph Corporation, New York, N.Y.

[22] Filed: Dec. 12, 1973

[21] Appl. No.: 426,612

Related U.S. Application Data

[63] Continuation-in-part of Ser. No. 283,633, Aug. 25, 1972, abandoned.

[52] U.S. Cl. ........................ 179/18 EA; 179/18 ES
[51] Int. Cl.² ........................................ H04Q 3/54
[58] Field of Search .......... 179/18 EA, 18 ES, 18 E, 179/18 AG, 18 AH, 18 GE, 18 GF

[56] References Cited
UNITED STATES PATENTS

| | | | |
|---|---|---|---|
| 3,449,526 | 6/1969 | Seemann et al. | 179/18 GF |
| 3,454,723 | 7/1969 | Lucas et al. | 179/18 EA |
| 3,542,960 | 11/1970 | Schneider | 179/18 E |
| 3,557,315 | 1/1971 | Kobus et al. | 179/18 AG |
| 3,636,263 | 1/1972 | Jezioranski et al. | 179/18 E |
| 3,701,853 | 10/1972 | Duval et al. | 179/18 HA |
| 3,766,324 | 10/1973 | Budrys et al. | 179/18 E |
| 3,812,298 | 5/1974 | Dittrich et al. | 179/18 EA |
| 3,816,668 | 6/1974 | Giesken | 179/18 EA |

*Primary Examiner*—Thomas W. Brown
*Attorney, Agent, or Firm*—J. B. Raden; M. M. Chaban

[57] ABSTRACT

Disclosed is a stored program, computer controlled telecommunications system including as its sole switching network an end-marked, multiple stage matrix network with a line side and a supervisory side. Almost all control functions including line scan and rotary dialed digit storage are included in the computer program, this procedure being possible due to the lack of need for any in-network controls. Certain peripheral circuits have appearances on both the line and supervisory side, these including an auxiliary loop usable as an overflow path providing added possibilities for completion of a path through the matrix network. The auxiliary loop is only called in on calls on which a speaking path has been established and on which the original path through the matrix network has been dropped during a change in the nature of a call. Additionally, other peripheral circuits, such as the Voice Frequency Receiver, Transfer Junctors and Attendant's loop, also have appearances on both sides of the matrix network to eliminate the need for additional auxiliary matrices and the need for added access ports. All circuits provided in high quantity, i.e., line circuits, trunks and junctors, have a minimum of access ports and minimal internal function. The network is designed for control of the end-marking from a fixed point on the one side to either a fixed or variable point on the supervisory side by a central processor or computer with the network path completion being directly responsive to the marking of the network ends without in-network controls.

12 Claims, 9 Drawing Figures 3,962,552

SWITCHING NETWORK AND PERIPHERAL CIRCUITS FOR TELECOMMUNICATIONS SYSTEM

RELATED APPLICATIONS

The present application is a continuation in part of co-pending application Ser. No. 283,633 filed Aug. 25, 1972, now abandoned.

BACKGROUND OF THE INVENTION

The present invention relates to electronic switching systems for telecommunications use enabling a reduction in matrix requirements and eliminating the necessity for all auxiliary access matrices. The reductions are effected without sacrificing service and without encountering an excess number of lost calls. The invention is especially applicable to systems using stored program control with a small to medium size computer or data processor controlling a matrix (preferably electronic) to permit automatic path completion responsive to marking of the matrix network ends.

Electronic switching system patents disclosing matrix networks of the type shown herein include, for example, U.S. Pat. Nos. 3,133,157 issued May 12, 1964 to E. Platt et al; 3,201,510 issued Aug. 17, 1965 to J. Bereznak; 3,204,044 issued Aug. 11, 1965 to V. E. Porter; 3,258,539 issued June 28, 1969 to N. Mansuetto et al; and 3,452,158 issued June 24, 1969 to N. Jovic. Each of these patents shows an electronic telephone switching system employing PNPN devices as crosspoints in an endmarked switching network. The network shown may be single stage or multiple stage networks of the end-marked type in which a mark is placed on both the line side and the supervisory side of the network responsive to a call having been initiated and a junctor having been allotted or selected to process that call. In response to the marks at both ends, one of a plurality of possible paths between the marked endpoints is automatically completed through the network between the marked points. On an incoming call, a like path is completed from the incoming trunk to the line side of the network to complete a path through the network.

Once a path has been established from a circuit on one side such as the line side to one supervisory side circuit, other supervisory side circuits may be necessary to provide call-processing functions. In each such case, the necessary function circuit is marked to complete a path from the new function circuit to the line circuit involved and the prior path can be dropped.

In U.S. Pat. No. 3,258,539 to Mansuetto et al, noted above, there is shown a system in which one network path is dropped when another path is completed through the network and the use of the first path is no longer necessary. In that system, when a trunk call is to be attempted, a first path from line to general purpose junctor is completed. When sufficient digits have been dialed into the control to determine that a trunk call is desired, a second path is completed from the calling line to an available trunk and the original path is dropped once the second path is completed. It is to this type of system that the present invention relates.

More recent U.S. applications, 264,567 filed June 20, 1972, and now U.S. Pat. No. 3,806,749 issued Apr. 2, 1974 and 264,568 filed June 20, 1972 both inventions of N. L. Jovic, and assigned to the assignee hereof, show matrix network configurations also usable herein.

SUMMARY OF THE INVENTION

The present invention is adapted for use in a program controlled telecommunications switching network, in which the central processor marks the ends of a multiple stage matrix switching network to allow a path to be completed between the marked ends of the network. A number of paths are available between the marked ends, and one of these paths is completed on a random or internally selective basis. On one side of the network, which may be called the line side, are separate appearances for circuits such as the subscriber line circuits, tandem junctors (two line-side appearances), tone lines and senders. On the supervisory side of the network are appearances for trunks, tone trunks, junctors and data trunks. Having appearances on both sides of the network are such peripheral circuits as Attendants' loops, Transfer Junctors, VF Registers, Auxiliary Loops and other circuits which may be termed feature circuits.

Appearances on both sides of the network allow these circuits to be accessed from one end or side of the network and to enter the network from the other end. In the case of the Auxiliary Loop, this circuit is accessed when a path from the line side to a marked trunk on the supervisory side cannot be completed through the network due to internal blockage. The Auxiliary Loop is only called into function when the call in process is one which has a talking connection already completed from calling station to called station, and another service is to be provided such as a transfer or a joining of stations for conference. The auxiliary loop provides a terminus for the path from the line side and marks the line side to attempt to complete a path to the marked supervisory side appearance.

The Attendant Loop, as provided, also has appearances on both ends of the network. This loop is accessed from the supervisory side or through the line side of the matrix to forward a call path therethrough. Thus, no auxiliary matrix is necessary for service to an Attendant Loop or attendant position. In the present application, responsive to the sensing of a station seeking service, a tone trunk is connected to the supervisory side of the matrix network to mark and complete a matrix path from the trunk to the station. A dial tone is thus provided through the tone trunk and forwarded through the matrix network to the calling station. The station may then begin dialing.

The same condition is true of the register, in that no auxiliary matrix is required and the register is accessed directly from the matrix.

The first digit, if interrupted dial pulse, is received by the central processor from the line circuit without the pulses passing through the matrix. The digit or sufficient digits are received and stored in the computer to determine the destination of the call and the type of supervisory circuit to be used, i.e., local junctor, trunk, tie line or the like. As a result of the analysis of the necessary digit or digits, a suitable supervisory circuit is connected to the supervisory side of the network and a path is completed through the matrix network to the calling line and the tone trunk and its path are released. As noted previously, the principle of completing a second path and resetting the first path is known from the previously cited patent to Mansuetto et al.

Within the network as shown from each line side circuit there are a predetermined number of paths available through the network to any given supervisory side circuit. In one form, we find that providing nine such paths between each fixed line side point and each fixed supervisory point, we provide sufficient trunking capability through the network. Further, by providing a second supervisory circuit choice for a call initiated in the exchange, in the event all paths are busy, the trunking capability is further enhanced.

One major improvement afforded by this invention is the provision of serial multiple paths through the network to connect various peripheral function circuits to a line circuit or trunk circuit seeking to complete a call through the network. This approach contrasts with the usual system in which function circuits "T" onto the connection by way of auxiliary matrices. All such auxiliary matrices are eliminated using the present system.

A major advantage of the present approach of placing most of the control logic into the computer resides in the ability to simplify the most numerous circuits of the system such as line circuits, trunks and junctors. These circuits have one or (in the case of junctors) two access ports to the matrix network, and their condition and status memory may be minimized. The less numerous circuits such as transfer circuits, attendants loop, auxiliary loop and register are provided with multiple access ports, the access ports being primarily accesses to the switching network.

These advantages are possible due to the high switching speed of the network. The use of the single matrix network controlled by a computer at computer data processing speeds allows the drop and re-connect switching used by the system disclosed.

It is, therefore, an object of the invention to provide new and improved peripheral circuits for a matrix switching network usable in a program controlled telecommunications system.

It is a further object of the invention to provide a central processor-controlled, end-marked matrix network employing circuits having appearances on both sides or ends of the network for selective access appearances and for overflow trunking through the network, said overflow being called into operation selectively only on calls for which a completed call is to be changed as to stations involved in the call.

It is a still further object of the invention to provide an Auxiliary Loop with speech path capability for providing an overflow path through the network when a normal speech path cannot be completed between marked ends of the network.

It is a still further object of the invention to provide a telecommunication system with an end-marked switching network controlled by a central processing unit for completing a path from a fixed point on one side of the network to a variable point on the other side of the network.

It is another object of the invention to provide a space division telecommunications switching system in which virtually all the switching of the system occurs in the network as controlled by a stored program data processor.

Other objects, features and advantages of the invention will become apparent from the following description viewed in conjunction with the drawings, as set forth in the brief description which follows.

Figure 1:
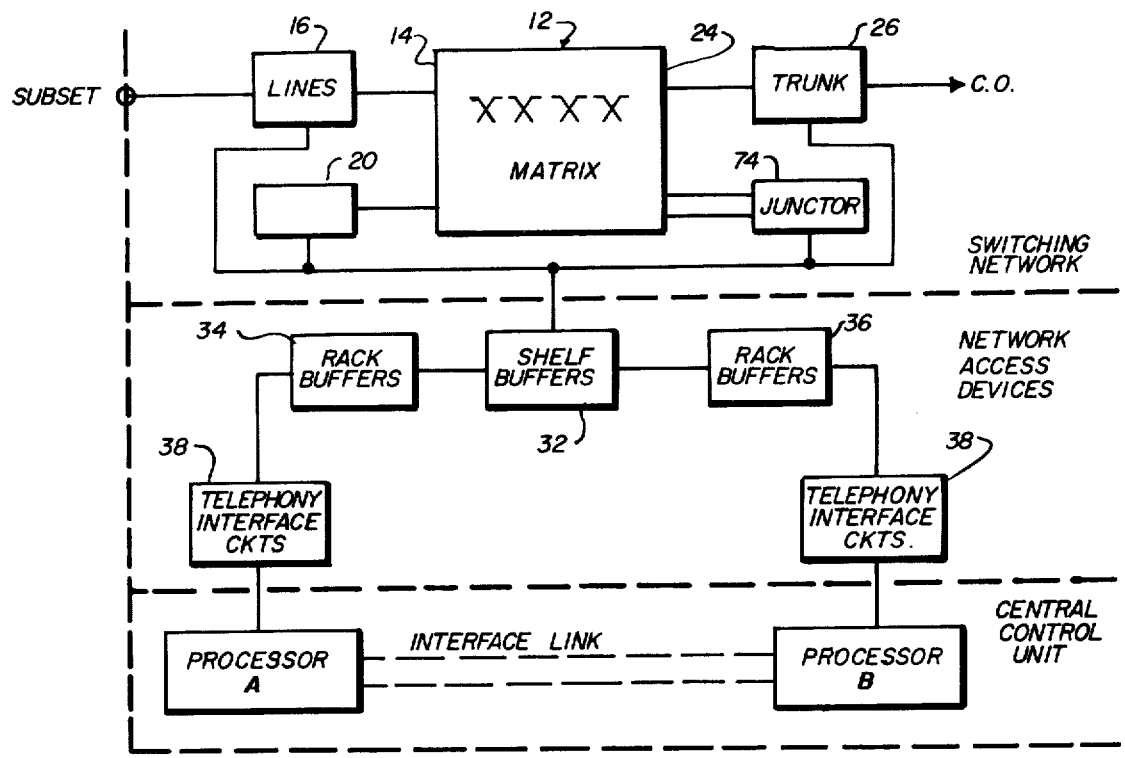
FIG. 1 is a schematic block diagram of the telecommunications system of the present invention.

DETAILED DESCRIPTION OF THE DRAWINGS:

In FIG. 1, we show in block diagram form, the telephone or telecommunications system employing our invention. Disclosed is a switching matrix network 12 shown schematically as having four stages. A network either of the type shown in the co-pending Jovic applications noted previously or as shown in the previously cited patents, may be used herein. In either event, a wholly electronic matrix network using solid state crosspoints is used which responds to the marking of the network ends to complete an available path with no added external controls. One side of the network, the line side 14, has connected to its input leads individual originating circuits such as line circuits 16, or other line side circuits 20 indicated in FIG. 1 in block form.

On the other side of the network, the supervisory side 24, are connected a plurality of terminating circuits such as junctor circuits 74 and trunk circuits 26. Line circuits, line side circuits, trunk circuits and junctor circuits are all connected for access and selection (if necessary) by the processors A and B through interfacing and buffer circuits, these being designated as shelf buffers 32, rack buffers 34 and 36, and interface and exclusion circuits 38. A system generally similar to that shown herein is known from U.S. Pat. No. 3,557,315, issued Jan. 19, 1971, to S. Kobus et al. In that patent, there is shown a system with two load-sharing processors controlling a matrix through buffer and interfacing circuits. In that system, separate scanners and registers are used to provide intermediate activities, these activities being performed in the processor of the present invention.

A similar system set forth in block form is shown in a paper by S. Kobus et al, entitled "Central Control Philosophy for the Metaconta Telephone Switching System," starting on page 509 of the International Switching Symposium Record published on June 3, 1972 by the IEEE.

The central control includes two independently operable processors (designated units A and B) each with its own data and program memories. They are connected to input-output devices and specialized circuits for automatic system supervision and maintenance. The Switching Network and Terminal Circuits are controlled by processing busses which are connected via the Telephony Interface (TIE) to Network Access Devices. The dual bus system extends to the shelf buffers where it is combined into a single common bus. Circuitry located within a shelf interfaces directly to the shelf buffer. Each processor is capable of handling the entire traffic, as is disclosed in the cited Kobus patent.

Each processor is a stored program, digital computer with 16-bit word length organization. One such computer usable herein is that known as the ITT Model 1650 processor. A readily commercially available computer which can be used is the SPC-16 computer which has been made and sold by General Automation, Inc. of Anaheim, California, and which has been on sale since 1971. Used is a random access memory with stored programs and data, and a word length of 16-bits. The normal memory capability of 32,000 words can easily be expanded to 128,000 words by adding basic 4000 word blocks into an external memory expansion area.

Figure 2:
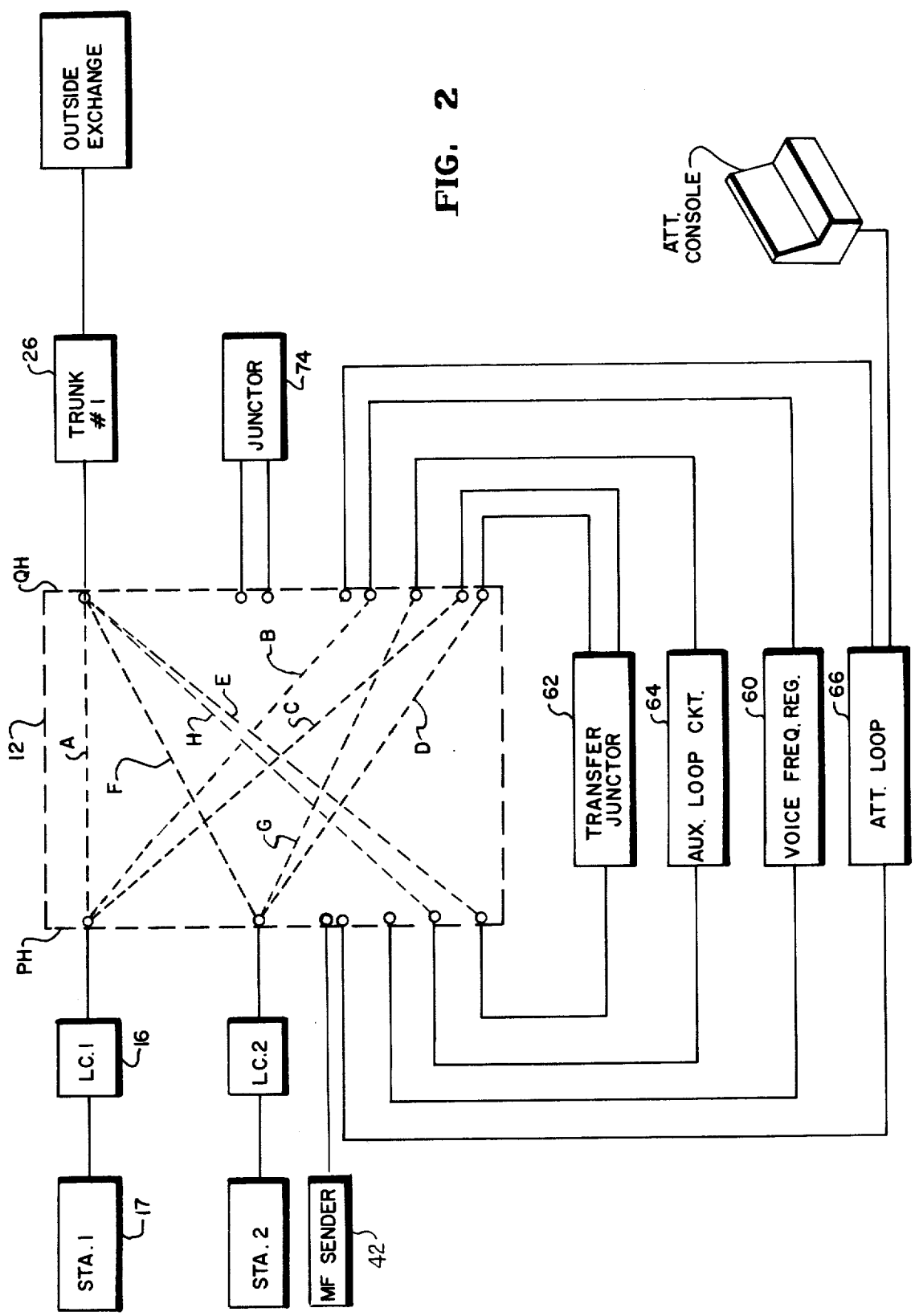
FIG. 2 is a schematic block diagram of the switching network and peripheral circuits of FIG. 1.

In FIG. 2 herein, we show schematically in greater detail, the switching network of FIG. 1. This principle shown herein is particularly adapted to a branch exchange such as a PABX, but may also be used in central offices properly equipped. In either type of exchange, the internal switching is accomplished through a matrix network 12. The matrix network is shown diagrammatically as a four-stage network, the stages being cascaded. The matrix network, whether single or multiple stage, is of a suitable end-marked type, and may be of the type shown in either of the previously-cited Jovic applications, or the type shown by the cited patents.

Referring now more specifically, the circuits of the network may be described in function as follows:

In one exemplary form, the switching network includes four cascaded stages interconnected to ensure maximum traffic flow between the network terminal circuits. The matrix network 12 preferably is of the space division type, employing electronic devices such as solid state PNPN device at each individual crosspoint switch, as previously mentioned. A plurality of crosspoints at the intersection of horizontal and vertical multiples form a matrix, the matrix dimensions for each stage being determined by trunking capability desired, etc. A number of such matrices or switches are grouped to form a group or block for interstage trunking.

The telephony circuits are peripheral to the network with all line circuits 16 having a single appearance on the originating or line side (PH) of the network, each such line circuit representing at least one telephone station 17 of the system. All trunk circuits 26 have a single appearance on the supervisory side (QH) of the matrix network, and connection to an outside line, as is well-known in the art. These line circuits and trunk circuits are the more numerous circuits provided and are simplified as much as possible. Other supervisory circuits, such as voice frequency registers 60, transfer junctors 62, auxiliary loop 64, attendant loop 66 and various feature circuits not shown may have network appearances on either side of the line, or certain of these circuits may have network appearances on both sides, depending on their particular field of application. Certain other circuits, such as junctors 74, have two appearances on their supervisory side of the network.

Use of an end-marked matrix network of either type referred to greatly simplifies the path selection and marking procedure, and allows these processes to occur in a very short period of time. By selecting one peripheral circuit having a supervisory side appearance on the network to be connected to the initiating line having the line side appearance on the matrix network and instructing both circuits to apply sequentially the proper voltage or mark potentials at their points of matrix connection, for example, negative on the supervisory side and positive on the line side, one of the available paths is automatically completed between the marked points, provided an unused path is available. This form of path completion may be effected in as little as 4milliseconds. Once both ends have been marked, an unused path is established through the entire four stages of the matrix network without external controls. The matrix network is designed such that between any line end terminal and one supervisory end terminal, one out of a possible plurality of parallel paths can be established automatically, Each such path search over the parallel paths occurs in a period of 4 milliseconds so that a series of path searches can be undertaken before the caller is aware of the activity involved. We find that by providing a predetermined plurality of which may be in the range of seven to ten parallel paths having access to each line side terminal and a sufficient number of supervisory circuits for each function, this configuration allows us to economically provide the grade of service at a desirable level.

The matrix concept disclosed herein does not require memory associated with busy-idle paths (network occupancy map) nor does it require inter-stage selection controls once the end marks have been set for a search.

The switching network disclosed is unbalanced, i.e., one wire is used for voice transmission, the other is returned to ground and balanced to the outside plant through a transformer. In the system shown interrupted dial pulses and ringing currents need not be passed through the network, these being developed at the end of the network at which the pulses or currents are to be transmitted from the network. For example, a tone line may be used to provide tones to line circuits when necessary. Tones in the voice frequency range may, however, be transmitted through the switching network. Thus, the system determines whether dialing information should pass through the switching network either directly or in decoded form (multi-frequency or voice frequency signals) or should be passed directly to the central processor (interrupted dial pulses for storage and translation by the computer).

The line circuit 16 used herein, has been designed to work in PABX applications. The line circuit is also capable of functioning satisfactorily with either rotary dial or with pushbutton tone signalling. Application of ringing current to the subscriber's subset is applied from the line circuit responsive to signals indicating that such signals are necessary. The basic functions of the line circuit are to detect the on-hook, off-hook state of the associated telephone station, extend the transmission path to the network and provide conversion from a balanced two-wire transmission line to an unbalanced single path, as mentioned. A line circuit which may be used herein is shown in block form in FIG. 5.

Each line circuit 16 has a single line side port or originating end network appearance. The processor (A or B) through its telephony interfaces handles service requests by scanning all line circuits on a periodic basis. Each line is interrogated by the processor generally at a predetermined time interval which may be in the range of 160 milliseconds for a scan through the system. The line circuits can be interrogated individually or in groups of sixteen. Lines involved in dialing or in other time-critical processing states are interrogated by the processor every subinterval which may be 20 milliseconds.

Two types of multifrequency sender circuits 42 may be used in this system. The first is used for multifrequency (MF) signalling, and the second is used for dual tone multifrequency (DTMF) signalling. The multifrequency senders provide generation of the known and generally used frequencies. They also execute control functions to perform execution of their respective signalling. Each multifrequency sender has a single line side matrix network appearance for transmitting its signals to the relevant supervisory circuit through the completed network path.

Figure 6:
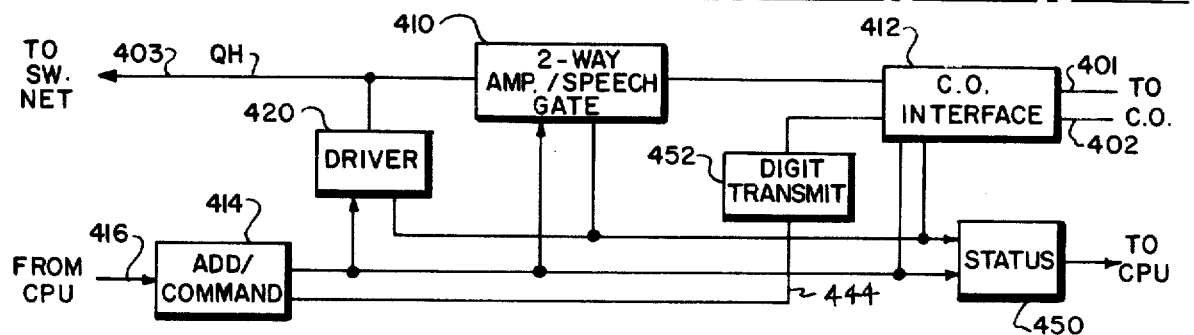
FIG. 6 is a schematic block diagram of a trunk circuit as used herein.

The trunk circuit 26, as shown herein in block form in FIG. 6, provides interface between the local exchange and a central office or another foreign exchange. Each trunk includes trunk control logic and circuitry meeting a plurality of interface requirements.

The trunks 26 extend voice transmission from the exchange shown to its central office, generate and respond to digit and supervision signals and generate a service "Request" function when action by system control is needed. The system control scans and interrogates the "Request" every period of 10 milliseconds. Any processor utilizing a trunk for call processing, will scan the in-process trunk every sub-interval of 20 milliseconds. Each trunk has a single supervisory side matrix appearance.

The junctor 74 as shown herein, provides a transmission path between two local line circuits, returns ringback tone (RBT) to the calling party during ringing of the called party, and provides two-way voice communication by means of a speech gate. Each such junctor has two supervisory side matrix appearances. A junctor 74 is seized when it is determined that a local call is being originated and that the local line is not busy. If the call completion requires other supervisory side circuits such as trunk circuits, the other supervisory circuit will be called in and the junctor connection dropped.

In a system such as that disclosed, lines, trunks and junctors must be provided in the greatest quantities. Thus, these circuits have been simplified by the removal of many logic and memory condition functions and the inclusion of these functions in the processor, the processor memory and logic being available due to the absence of in-network controls within the processor.

Transfer junctors 62 provide transmission capability for calls requiring consultation or conferencing with a third party. Thus, the transfer junctor has one line side and two supervisory side matrix appearances, so that it may be accessed over the supervisory side and initiate a path to another line by its second supervisory side appearance. The trunk line to the central office or outside exchange is subsequently connected to its line side appearance.

The auxiliary loop 64 provides an alternate network path employed as a second path during reestablishment of previously existing network paths. The purpose of the auxiliary loop is to decrease the number of lost calls in instances where a conversational path has been completed and changes are being made in the call, i.e., transfer or release of conference parties. The secondary function of the auxiliary loop is to provide a low level tone source to both parties rquired as part of the call waiting feature. The auxiliary loop may also be used to insert tones into the path if desired. The auxiliary loop has one line side (PH) and one supervisory side (QH) matrix appearance, as will be explained in greater detail.

If in one of the conditions noted above, for example setting up a conference, a path is completed through the network from a calling line to a conference feature circuit. The use of such a transfer feature is possible both on established completed incoming and outgoing calls. In either case, the internal station may consult and transfer to a second internal station under the control of the first station.

The feature of transferring calls by the use of transfer junctor 62 is initiated by a signal from the local stations' hookswitch. The outside subscriber is placed in hold and the network path from the station to the trunk is replaced by a connection from station line to transfer junctor 62. The local station receives dial tone. The local station then dials the desired called station and carries on a conversation after the called station has answered. A three-way conference can be initiated by the local station resignalling, which takes the outside subscriber out of the hold condition. Transfer of the call to the second or called local station can be initiated when the first station goes on hook either during consultation or conference.

In the implementation of this transfer feature, it would pose a considerable problem if the outside station, once on hold, could not be reached again due to an internal blockage in the switching network. Once the trunk is placed on hold, the path through the network is dropped, a path must be provided for the completion of a call path to the second internal station through the transfer junctor. With about nine paths available between the first station and each junctor, and with a plurality of junctors available, the probability of failing to receive a path through the network will be about 0.01. By providing a small number of auxiliary loops, the possibility of not failing to receive an available path can readily be reduced to a value of $1 \times 10^{-5}$. With this extremely low probability of failure in reaching the station once the call has been indicated as one which cannot be lost, the reset principle may be employed safely without risk of loss of the call.

As shown in FIG. 2, a path A from Line No. 1 to the trunk No. 1 comprises the normal talking path. Line No. 1 initiates a transfer function by making a hookswitch signal which when scanned and recognized by the computer results in the line to trunk connection being released, and path B being conneced to a free voice frequency register 60. The subscriber dials the called line number and the computer, on receipt of these digits, checks the busy/free state of the called line. Assuming the line is free, the path B is released, and a free transfer junctor 62 is chosen. Paths C, D and E are now established and the called line No. 2 is rung. On answer line No. 1 converses with line No. 2 via paths C and D, the trunk remaining on hold during this consultation phase. Line No. 1, by a second hookswitch signal, causes a conference connection to be established via path E to the trunk circuit 26. To initiate the transfer, line No. 1 releases from the connection by hanging up. The paths C, D and E are disconnected and the path F from line No. 2 to the trunk 26 is attempted in the event of a blockage; where free paths are not available, the computer selects a free auxiliary loop 64 which has matrix appearances on either side of the network. Connections G and H are attempted from the chosen auxiliary loop, which, if either also encounters blockage, a second auxiliary loop is chosen and G and H connections are made. The auxiliary loop matrix appearances are distributed evenly about the matrix to avoid localized blocking. Each of these path searches occurs in a period of about 4 milliseconds so that the entire path completion occurs in too short a duration to be noticed by the individuals using the system.

At any rate, the concept requiring alternate paths is one of reducing the blocking probabilities to an arbitrarily small number to be chosen for the particular system. In this connection, however, other possible compromise conditions become available. For example, the number of crosspoints available per line can be reduced in the matrix, accepting a higher blocking probability on the first trial by reducing the effective probability on subsequent trials, and further, if desired, by the use of the auxiliary loop concept. For example, on one particular instance, we have calculated using a traffic formula for a traffic of 7 ccs., we would get a blocking probability of 0.021 if we reduced the lineograph from nine parallel paths to eight parallel paths. The effect of this would be to reduce the number of crosspoints per line by a little less than two. It is approximated that the use of some 12 auxiliary loops in a system with known traffic rate could produce an effective blocking probability of 0.01 in a 1000 Line Exchange. This probability would be on the basis of blocking probability of 0.02 on a first trial. The cost of providing twelve auxiliary loops is equivalent in cost to 0.5 crosspoints per line, allowing a resultant system reduction of 1.5 crosspoints per line for calls which cannot be lost.

Figure 3:
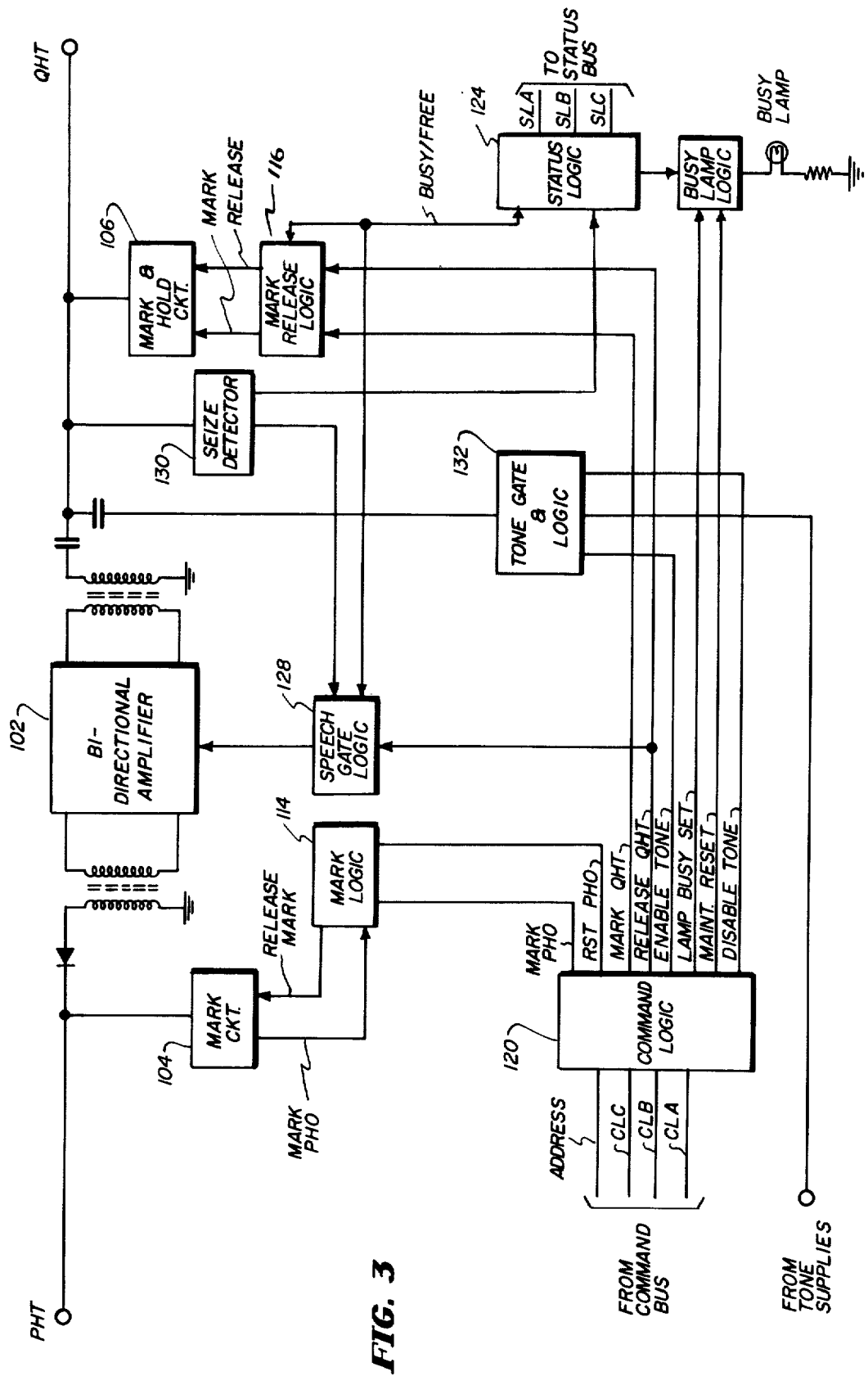
FIG. 3 is a schematic block diagram in greater detail of the Auxiliary Loop of FIG. 2.

A functional block diagram of an auxiliary loop 64 is shown in greater detail in FIG. 3. There, we show a bi-directional amplifier 102 in series with the path from the line side PH Term. representing the originating or line side terminal of the matrix and the QH Term. representing the supervisory side terminal of the matrix.

For each side of the circuit (line and supervisory), there is provided a mark circuit 104 and 106 to place the necessary voltage condition providing end marks on the respective sides of the matrix, the circuit 106 on the supervisory side also providing the matrix hold function. Each mark circuit is controlled by a respective logic or flip-flop circuit 114 and 116, the inputs to the logic circuits 114 and 116 being received from a command logic circuit 120, which, in turn, is fed from the command bus of a processor. This command logic circuit includes gates to identify the address of the auxiliary loop circuit from the CPU and identify or decode the message received, and gate the message received onto the proper lead accordingly. Such circuits are well-known in the art. A status logic circuit 124 provides feedback or status information to the status bus of the processor, the status logic circuit 124 receiving its input as to the idle or busy condition of the auxiliary loop circuit from the supervisory side mark logic circuit (seize detect flip-flop 130) and from the speech gate logic 128. The speech gate logic (flip-flop) 128 controls the bi-directional amplifier 102. A tone gate and logic circuit 132 controlled from the command logic, is provided to gate the tone path through the bi-directional amplifier 102, to transmit tones to the stations involved in a call when commanded to do so by the controller.

The auxiliary loop 64 may be considered to be an overflow circuit between line side appearance circuits and supervisory side appearance circuits. The overflow circuit is only resorted to in situations where an indication stored by the processor shows that a call in process clearly should not be lost. The auxiliary loop may be used to provide added paths through the network in either direction. As such, the auxiliary loop provides an additional plurality of paths for connections between circuits blocked through their regular matrix paths and provides a virtually non-blocking matrix for such calls.

The auxiliary loop receives address and command signals from the central logic of the processor handling a call and identifies its own address and gates the command to the indicated gating or flip-flop circuits. Upon receipt of the proper command from the processor and supervisory central logic, the loop provides a marking voltage for the line side of the matrix through flip-flop 114 and mark circuits 104 and for the supervisory side through flip-flop 116 and mark circuit 106. The loop also provides a holding path for the line side of the matrix after seizure. Upon a command from central logic, the circuit marks the supervisory side (QH) terminal with a suitable marking voltage. The loop circuit detects seizure of the terminating side of the matrix and provides a holding path. Upon seizure, the auxiliary loop circuit returns a busy status indication to the central logic when addressed. A visual busy indication may also be provided when the circuit is in an active condition.

The auxiliary loop circuit also enables the speech path between the two parties responsive to a signal from the speech gate logic 128. The tone gate and logic circuit 132 provides flip-flop logic to enable a tone to be sent to both parties to a call when so commanded by the central processor. Upon command from the central processor logic, either side of the matrix connection may be released by gating the suitable output lead of command logic 120. In this way, the speech path is disabled when the matrix is released. A path free indication is then returned to the central logic via the status logic 124 that the auxiliary loop has been released when the auxiliary loop circuit is addressed.

In the case of Call Waiting, Camp-on-Busy or Assigned Night Answer, upon command from the central logic, when the auxiliary loop is involved in the call, a tone received from the system tone supply is gated through the tone gates and sent to both parties. Thus, the auxiliary loop may be used to insert audio tones into a call path when desired.

The circuitry of the auxiliary loop maintains the overall system requirement for crosstalk and noise. A bi-directional amplifier (102) is included to insure that the Auxiliary Loop is transparent for purposes of speech therethrough.

Figure 4:
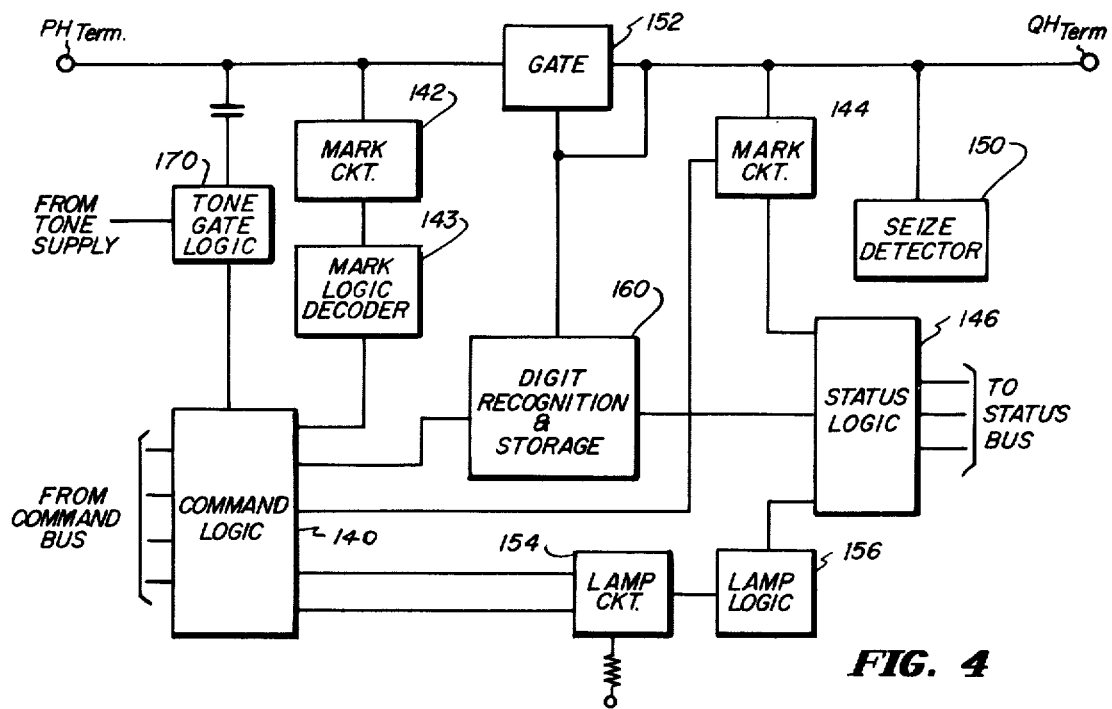
FIG. 4 is a schematic block diagram in greater detail of the V. F. Receiver.

The VF register shown in detailed block form in FIG. 4 has as its main function, the acceptance of VF signals and conversion to a digital form in a response to address and command signals from the central processor and the extension of the digits via status signals to the central processor. The register accepts matrix mark signals from the processor and marks either the line or supervisory side of the matrix network under the control of the processor, the processor determining the direction of a call, as internally originated or externally originated.

The VF register circuit responds to command signals from the processor, verifies its seizure to the processor, provides matrix hold current and lights busy lamp on command from central control or when seized. The register accepts keyed tones and generates a request to the central processor on the request bus for subsequent acceptance of tones in the desired direction. The keyed tones are changed within the register from two out of seven to BCD. The register also provides a parallel readout of the keyed information digits upon receipt of an indication from the central processor to do so and also provides a method of checking the register status output gates. When the register is free and is addressed, it returns an idle code on the status bus, and of course, returns a busy status signal when seized.

In a PABX application, the register may act as a toll restrictor. On outgoing calls when this register circuit is employed, the dial signals from the calling line are processed via the VF register to the outgoing trunk which decodes the digits and forwards them to the processor. The central logic checks the dialed digits and the class of service of the calling line for any toll restrictions during this processing.

Viewing FIG. 4, it can be seen that many of the features of the VF register are identical to those of the Auxiliary loop. The VF register recognizes its address from the CPU and accepts the matrix mark signals from its Command Logic 140 and from its decoding gates and marks the line side or PH terminal of matrix when its primary matrix Mark Circuit 142 is enabled by the Logic Decoder 143, responsive to the proper decoded signal. The supervisory side is marked when its quaternary matrix Mark Circuit 144 is enabled. The register then sends a marking code through its Status Logic 146 to the central processor to indicate the status of the register as having been busied. Lamp 154 and Lamp Logic 156 provide a visual indication of the register condition. The register, when seized, as indicated by the Seize Detector 150, verifies the seized condition to the central processor by disabling the marking code, enables a seized code on the status bus, and opens the line gate 152. The Tone Gate and Logic 170 enables gating of audible signals to the connected subscriber.

The register provides input impedance at the line circuit terminals of at least 1100 ohms during the dialing period. Digits are received as tones within the receiver using known type Digit Recognition and Storage 160, extended to it from the register interface. The Digit Registration and Storage circuit may be of the type shown in co-pending application of D. Sellari, filed Dec. 23, 1970, entitled "Multi-Frequency Receiver", now U.S. Pat. No. 3,710,031 issued Jan. 9, 1973.

No register is provided for interrupted dial pulses as these digit pulses are scanned by the processor and the digital information is stored in the processor for control of the finding of a called line or trunk.

The system disclosed provides an auxiliary loop used only on calls where a talking path has been in effect and is to be changed. Thus a path must be virtually guaranteed for such calls. The auxiliary loop is not called in when a normal call is blocked. Thus an indication must be provided in the CPU memory indicating that a MUST call is blocked, and the auxiliary loop called in to provide a path from one variable point at one end of the network to a fixed point on the other side of the network. This may readily be accomplished by a flip-flop or equivalent in the status memory which is responsive to indications (1) that a MUST call such as a transfer call, attendant release, conference call or the like is being blocked, and that an auxiliary loop should be called in.

Figure 5:
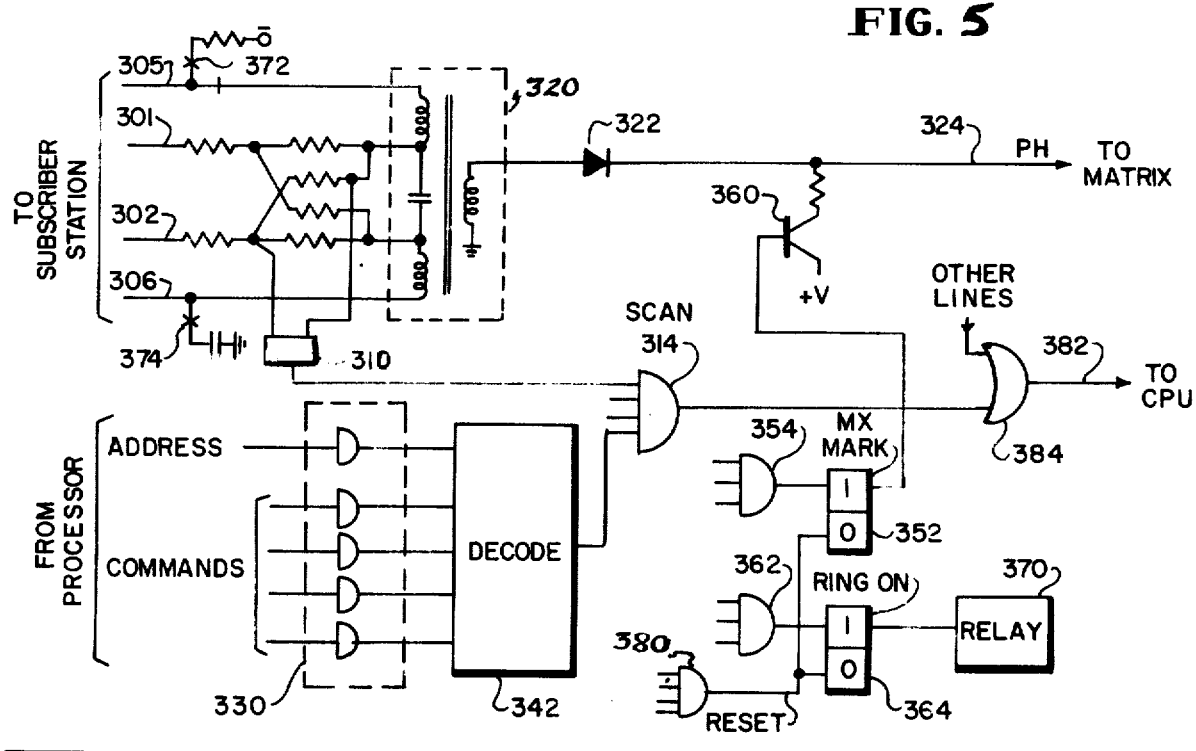
FIG. 5 is a schematic block diagram of a line circuit as used herein.

In FIG. 5, we show in simplified form the functional elements of a line circuit as used herein. The line circuit has two line loop or speech leads, 301 and 302 connected to the speech leads of the subscriber station, and ringing and bias leads 305 and 306 directed to the station. Connected across the speech leads is a loop detector 310 of the type shown in U.S. Pat. No. 3,525,816 issued on Aug. 25, 1970 to E. Herter. This detector responds to a closed loop condition to provide one input to scan gate 314.

The line circuit further includes a standard transformer 320 with its secondary unbalanced to ground and coupled through diode 322 to a matrix P multiple on lead 324.

The line circuit has an address and command gating network 330 similar to that previously discussed relative to the auxiliary loop circuit. This network responds to its address and coded commands from the processor to provide a second input to the scan gate 314 to provide a status indication on gate 384 to the processor to indicate the status of the line circuit as on-hook or off-hook for subsequent testing and the like.

The address and commands for the CPU are decoded in decoder 342 to provide the previously mentioned scan gate input. The commands as decoded are fed to one or the other of a pair of gated flip-flops. The upper flip-flop 352 responds to matrix mark commands through gate 354 to change the condition of the matrix mark flip-flop 352. This condition change is transmitted to the base of the transistor 360 and mark the PH lead 324 of the matrix corresponding to this line circuit as one seeking a path through the matrix.

If the received command as decoded is one directed to providing ringing tone to the line, gate 362 activates flip-flop 364 to operate relay 370. Contacts 372 and 374 of relay 370 close to provide ring current to the called line circuit. A reset gate 380 responds to reset signals from the CPU to reset an activated one of the flip-flops 352 or 364 to restore the activated flip-flop to the inactive condition.

Thus the line circuit responds to the loop condition to mark the status lead 382 through status gate 384 and responds to the processor to mark the matrix network lead as a line seeking service. Thus supervision of the line loop is accomplished by means of the loop detector to provide status indications to the processor without reference to the matrix marking function.

FIG. 6 shows in block form a typical trunk circuit which has a speech path with leads at 401 and 402 at one end to the central office and a single speech path lead 403 at the other end for connection to a Q multiple of the matrix switching network. A two-way speech amplifier 410 provides a hybrid and speech gate for the speech path through a suitable C.O. interface 412 of any known type. As in the previously described peripheral circuits an address and command receiving network 414 gates and decodes incoming signals to recognize the address of a trunk being sought by the processor over lead 416 and to respond to activating commands. If a command as decoded indicates this trunk is to be seized, a signal is sent to the matrix mark driver 420 to mark the Q terminal lead 403 of the network as seeking a path through the network. The response of trunk is sent back to the processor from status indicating circuit 450 to mark the trunk as seized. The trunk circuit further includes a path from the processor command circuit 414 to provide interrupted dial pulses to the C.O. interface over path 444 and digit transmission circuit 452.

The command also may activate the speech gate amplifier 410 to open a speech path from the matrix to the C.O. under commands from the processor and to close the speech path when commanded to do so. Again, a circuit is provided with minimal function therein to provide a low cost trunk capable of functioning in the system disclosed.

Figure 7:
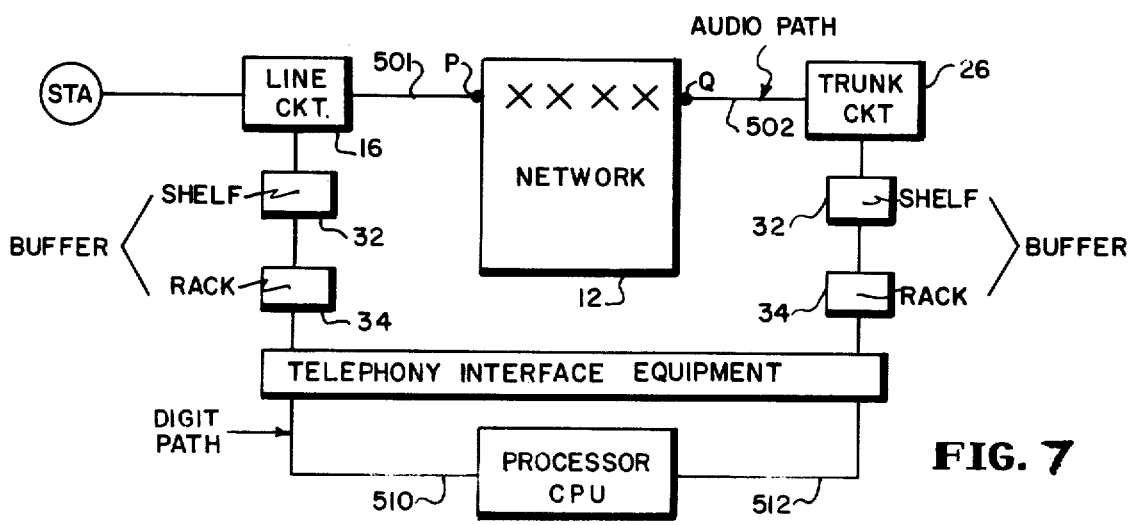
FIG. 7 is a schematic block diagram of the digital pulsing path from a line to a trunk.

In FIG. 7, I show in block form the system as it is configured to provide an audio or speech path over leads 501 and 502 from a line circuit 16 to a supervisory circuit 26 for audio, speech or tone transmission. This path directly through the matrix network 12 is used for all tone transmission and for recording and transmission of multi-frequency tone signalling.

Where interrupted dial pulse digits are transmitted from a line circuit such as the one shown in FIG. 7, the pulses are coded into status path 382 shown in FIG. 5 and pass through shelf and rack buffers and telephony interface equipment to the processor over path 510 for storage, translation and evaluation. In the event the dialing information is to be forwarded through a trunk, the digital information is sent over path 512 to the C.O. interface (FIG. 6) and the C.O. in response to address and command signals from the processor.

Thus, as mentioned, interrupted dial signals are transmitted to the processor for use by a trunk over a path bypassing the switching network while tone frequency dialing passes through the switching network, as do tones, speech and other audio signals.

Figure 8A:
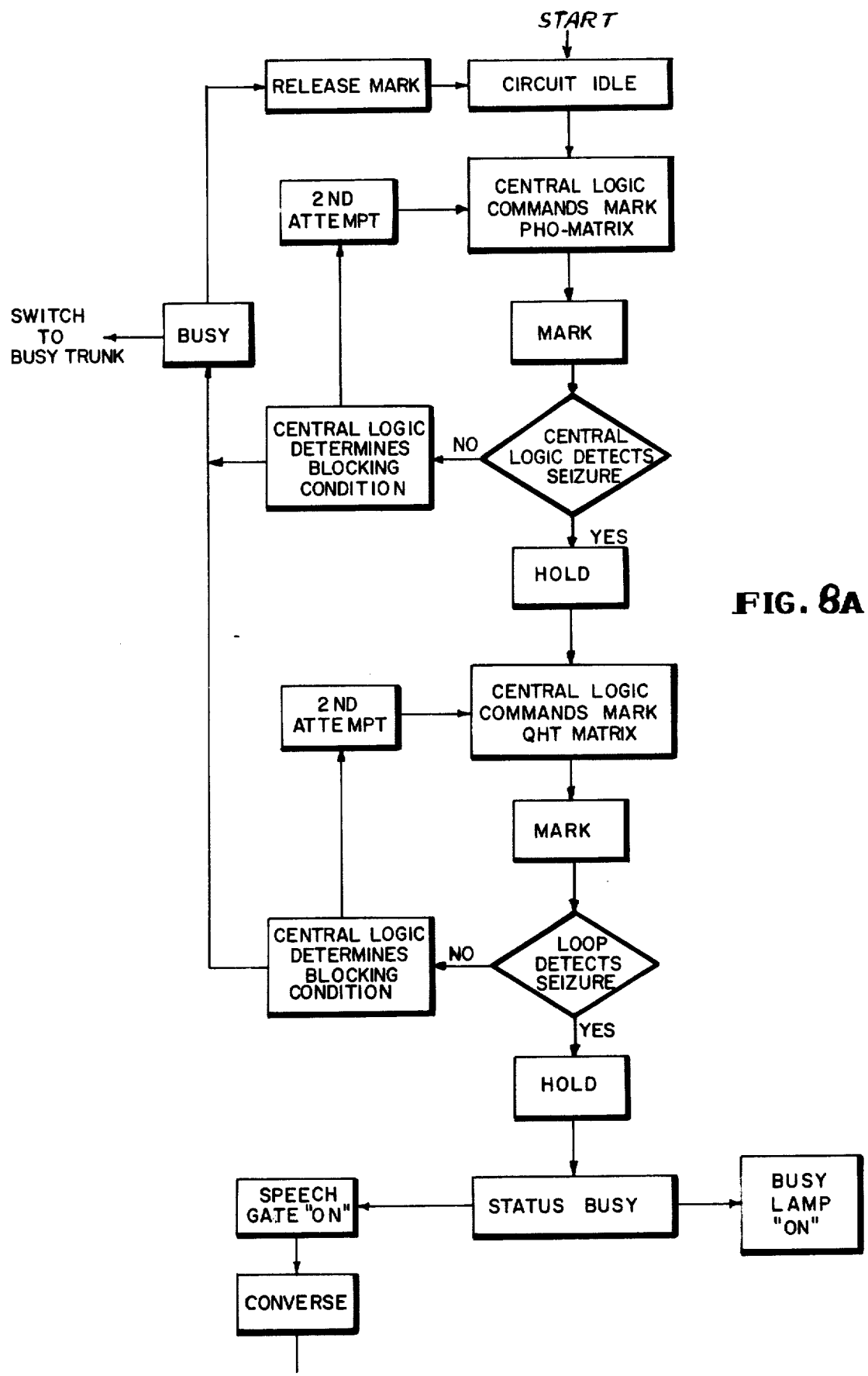
FIGS. 8A and 8B when placed with FIG. 8B below FIG. 8A combine to form a chart of the sequence of operations for the Auxiliary Loop of FIG. 3.
Figure 8B:
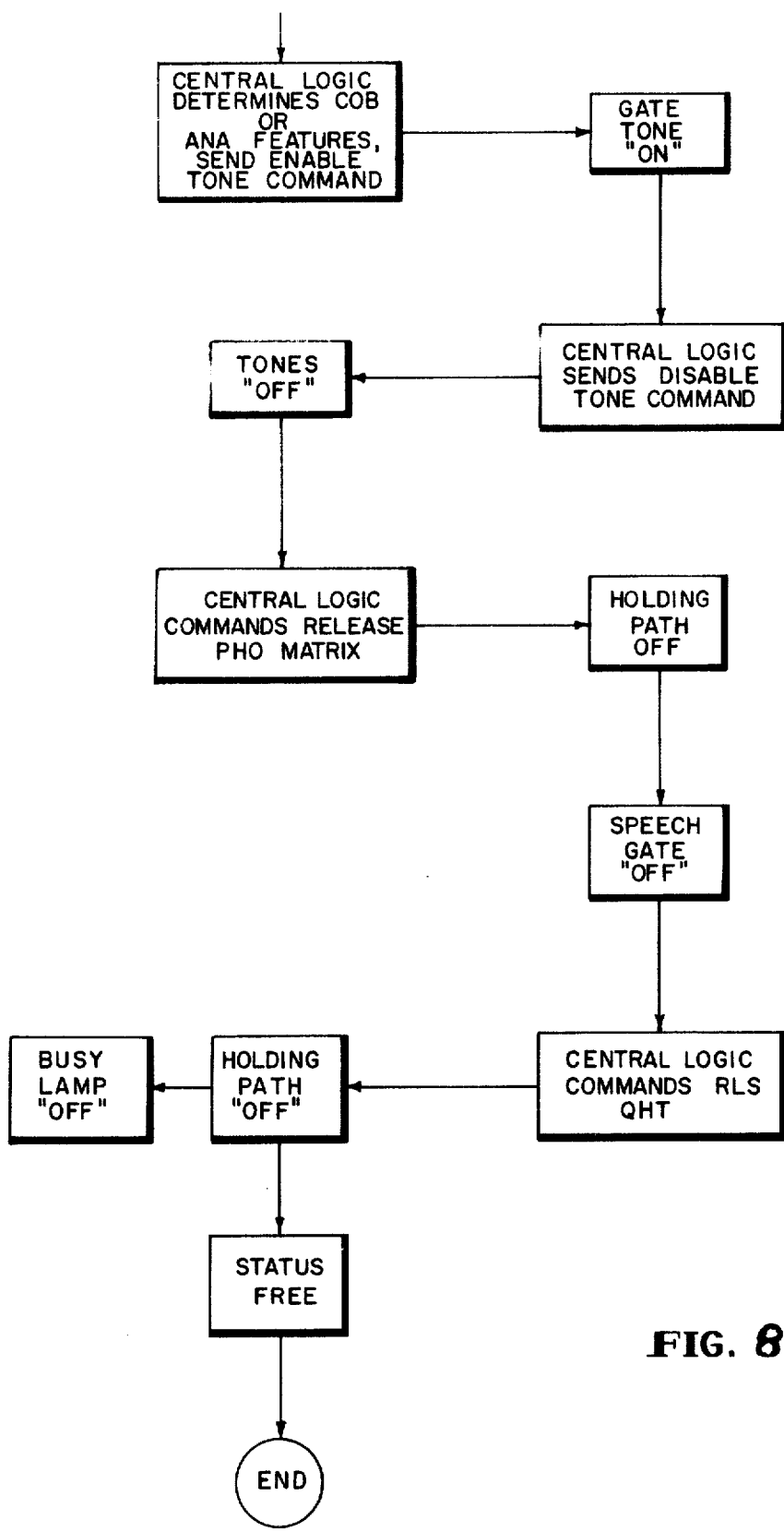

In FIG. 8, we show a flow diagram for the sequence of events followed in the operation of the auxiliary loop. It is originally presumed that the auxiliary loop is idle. The next step in the sequence as indicated shows that the control logic within the auxiliary loop receives commands to mark the primary side of the network. Responsive to this command, the "P" side of the network is marked. The control logic then detects seizure.

Two alternatives are possible: If a blocking condition is detected, a second attempt is made to mark the primary side of the matrix for following through of the sequence. In the event that no blocking condition exists, the sequence continues following which the control logic commands that the "Q" or supervisory side of the matrix be marked. The matrix mark is therefore applied.

Again the loop detects seizure with two possible alternatives: If a blocking condition is found, a second attempt is made to mark the supervisory side of the network. However, if the second attempt has been made and a failure to seize is found, the indication is sent back that the auxiliary loop circuits are busy and a release of the marking is initiated.

In the event the seizure is effective, a holding current is applied to the mark and the auxiliary loop returns a status busy signal to the central processor. Busy lamp is switched to the "on" condition. With the loop in the busy condition, the speech gate is turned on allowing the parties to the conversation to converse. Thereafter, the central logic determines any special features such as camp-on-busy or assigned night answer, in which case a tone is sent to both subscribers on a command from the central logic. This tone is effected by operation of the tone gate.

At sometime thereafter, on either operation of a time period or on a signal indicating that one or both parties to the call have gone on-hook, the central logic transmits a signal to release the primary side of the matrix. The holding path for this side of the matrix is released. The speech gate is then shut off, the central logic provides a signal to release the supervisory side of the matrix, following which the holding path is switched off. The busy lamp is also switched off. Thereafter the status indication to the central processor is changed to an indication that the auxiliary loop is now free and available for use.

We claim:

1. A telecommunications system including a central program controller, an electronic switching network comprising a plurality of cascaded stages between its line end and its supervisory end, said network being of the end-marked type, a plurality of line circuits coupled to respective terminals on said line end and a plurality of junctors and trunks coupled to respective terminals on said supervisory end, said line circuits, trunks and junctors responsive to signals from said controller for marking respective terminals representative of a selected line end circuit and a selected supervisory end circuit, a predetermined number of available paths through said network from a selected terminal on one end of said network to a selected terminal at the other end of said network, said network responsive to marking of a terminal at one of its ends and a terminal at the other of its ends to attempt completion of a path through the network over a random one of said paths in self-seeking fashion, and including a plurality of circuits peripheral to said network, each of said peripheral circuits being connected to a terminal at said line end and a terminal at said supervisory end for providing access to both ends of said network for providing a second plurality of available paths through a peripheral circuit between a peripheral circuit terminal at either end of said network and a terminal at the other end of said network responsive to failure of attempts at completion of a path from one end of said network to the other end thereof responsive to said mentioned marking of the network ends.

2. A system as claimed in claim 1, wherein each said peripheral circuit comprises an auxiliary loop circuit including a closed loop parallel to said network, means in said auxiliary loop circuit for marking a terminal on the line end and a terminal on the supervisory end of said network for causing a serial path to be completed from the first marked terminal on said line end to the marked terminal of said auxiliary circuit on the supervisory end, through the loop circuit to the marked terminal on the line end representing said auxiliary loop through the network to the first marked supervisory end terminal.

3. A PABX telecommunications system including a central program controller, an electronic switching network controlled by said controller comprising a plurality of cascaded stages between its line end and its supervisory end, said network being of the end-marked type which automatically attempts to find an available path between marked terminals at both its ends, a plurality of network access circuits connected to respective network terminals, said access circuits including line circuits coupled to respective terminals on said line end and junctors and trunks coupled to respective terminals on said supervisory end, each said line circuit individually responsive to signals from said controller for marking a respective terminal representative of the signalled line circuit, and said trunks and junctors responsive to seizing signals from said controller to mark a supervisory end terminal, a predetermined number of paths through said network from a selected terminal at one end of said network to a selected terminal at the other end of said network, said network responsive to marking of a terminal at one of its ends and a terminal at the other of its ends to attempt completion of one of said available paths through the network in self-seeking fashion, said system including a plurality of circuits peripheral to said network, each of said peripheral circuits being connected to a selected terminal at said line end and a selected terminal at the supervisory end for providing access to both ends of said network for completion of a path through a second predetermined number of paths from a selected peripheral circuit terminal through said network to a terminal of a desired circuit at the other end of said network, and each said peripheral circuit having means for receiving and decoding digital information received from said controller for controlling the marking of terminals at both ends of said network.

4. A telecommunications system including a central controller, an electronic switching network, said network being of the end-marked type, a plurality of line circuits coupled to respective terminals on one end and a plurality of junctors and trunks coupled to respective terminals on the other end of said network, said line circuits, trunks and junctors responsive to signals from said controller for marking respective terminals representative of a selected circuit at one end and a selected circuit at said other end, a plurality of available paths through said network from a selected terminal on one end of said network to a selected terminal at the other end of said network, said network responsive to marking of a terminal at one of its ends and a terminal at the other of its ends to attempt completion of a path through the network over a random one of said paths, and including a plurality of circuits peripheral to said network, certain of said peripheral circuits being connected to a terminal at each end of said network for providing access to both ends of said network, one of said certain circuits being allotted by said controller to provide an alternate plurality of available paths from a terminal of the allotted peripheral circuit at an end of said network to a selected terminal at the other end of said network responsive to failure of attempts at completion of a random path through said network.

5. A system as claimed in claim 4 wherein said certain peripheral circuits each comprise an auxiliary loop circuit, each said auxiliary loop circuit including a closed loop parallel to said network, means in each loop circuit for marking a terminal on the said one or line end and a terminal on the other or supervisory end of said network for causing a serial path to be completed from the first marked terminal on said line end to the marked terminal of said auxiliary loop circuit on the supervisory end through the auxiliary loop circuit to the marked terminal on the line end representing said auxiliary loop circuit through the network to the marked supervisory end terminal.

6. A telecommunications system employing an electronic switching network controlled by a stored program data processor for providing interconnection between stations of said system, and including a line circuit coupled to each station, means at certain of said stations for generating dial pulses in the form of interruptions of the station line loop, a first path from each line circuit to said network for the completion of a talking path through said network, means in each line circuit for continuously sensing the condition of the line loop at its coupled station, and a second path for forwarding signals representing said sensed condition to said processor for storage of said signals and for the return of control signals from said processor independently of the connection of the line circuit to the network, said sensed condition signals including interrupted dial pulses received from stations coupled to the line circuit.

7. A system as claimed in claim 6, wherein the first path from each line circuit comprises means responsive to receipt of its own address from the processor and suitable commands from the processor for coupling the addressed and commanded line circuit to said switching network, said coupling means comprising means for providing a voltage mark signal to one end of said switching network.

8. A telecommunications system employing an electronic switching network controlled by a stored program data processor for providing interconnection between stations of said system wherein said switching network is of the type in which a terminal at each end of said network is marked by a bias voltage to automatically complete a path between the marked terminals in response to a call attempt, a plurality of circuits having access to said network for coupling thereto, including a plurality of line circuits with one line circuit coupled to each station with each line circuit having connection to a terminal on one end of said network, means in each line circuit for continuously sensing the condition of a line loop at its station, a signal bus between said access control circuits and said processor for forwarding signals representing said sensed conditions to said processor for storage and action independently of any connection of the line circuit to the network, and means in a line circuit responsive to signals received from the processor as a result of sensed conditions for marking the line circuit end of said network with a bias voltage to initiate an automatic path completion.

9. A system as claimed in claim 8, wherein each line circuit comprises means responsive to receipt of its own address from the processor and suitable commands from the processor for coupling the addressed line circuit to said switching network, said coupling means comprising means for providing a voltage mark signal to one end of said switching network.

10. A telephone system including an electronic switching network of the end-marked type responsive to signals received from a central control processor comprising a first end comprised of terminals coupled to line circuits and to specialized circuits and a second end comprised of terminals coupled to junctor circuits, to trunk circuits and to supervisory ends of specialized circuits, means in each of said circuits receptive of control signals from said processor for marking a terminal of said network for path completion from said terminal, and said network is responsive to the marking of a terminal at said first end and a terminal at said second end for automatically seeking to complete a path between the terminals of said network corresponding to circuits signalled by said processor, means in said specialized circuits for marking the respective ends of the network for completing a serial circuit including plural paths through said network from a line circuit to a trunk circuit using at least one other line end terminal of a specialized circuit selected by said processor.

11. A system as claimed in claim 10, wherein each said line circuit and each said trunk circuit has only one end terminal on said network, said junctor circuits have two terminals on the second end of said network, and said specialized circuits have at least one terminal on the first end of said network and at least one terminal at the second end of said network.

12. A system as claimed in claim 10 wherein there is a bi-directional speech frequency amplifier in each specialized circuit, and means in each specialized circuit for activating its amplifier after the marking of its first end terminal and its second end terminal.

* * * * *